Dec. 9, 1958     B. L. BRUCKEN     2,863,311
GYRATION AND ROTATION MECHANISM FOR DOMESTIC APPLIANCE
Filed June 29, 1954     11 Sheets-Sheet 1

INVENTOR.
Byron L. Brucken
BY
His Attorney

Fig. 5

INVENTOR.
Byron L. Brucken

His Attorney

Fig. 6

Dec. 9, 1958   B. L. BRUCKEN   2,863,311
GYRATION AND ROTATION MECHANISM FOR DOMESTIC APPLIANCE
Filed June 29, 1954   11 Sheets-Sheet 5

······▶ HOT AIR FLOW
---▶ CONDENSER WATER FLOW

INVENTOR.
Byron L. Brucken
BY
R R Cander
His Attorney

Dec. 9, 1958 B. L. BRUCKEN 2,863,311
GYRATION AND ROTATION MECHANISM FOR DOMESTIC APPLIANCE
Filed June 29, 1954 11 Sheets-Sheet 6

Fig. 10

INVENTOR.
Byron L. Brucken
BY 
His Attorney

Fig. 11

Dec. 9, 1958    B. L. BRUCKEN    2,863,311
GYRATION AND ROTATION MECHANISM FOR DOMESTIC APPLIANCE
Filed June 29, 1954    11 Sheets-Sheet 8

INVENTOR.
Byron L. Brucken
BY
His Attorney

Dec. 9, 1958  B. L. BRUCKEN  2,863,311
GYRATION AND ROTATION MECHANISM FOR DOMESTIC APPLIANCE
Filed June 29, 1954  11 Sheets-Sheet 9

INVENTOR.
Byron L. Brucken
BY
R R Caudor
His Attorney

Dec. 9, 1958 B. L. BRUCKEN 2,863,311
GYRATION AND ROTATION MECHANISM FOR DOMESTIC APPLIANCE
Filed June 29, 1954 11 Sheets-Sheet 10

INVENTOR.
Byron L. Brucken
BY
His Attorney

Dec. 9, 1958     B. L. BRUCKEN     2,863,311
GYRATION AND ROTATION MECHANISM FOR DOMESTIC APPLIANCE
Filed June 29, 1954     11 Sheets-Sheet 11

Fig. 23

INVENTOR.
Byron L. Brucken
BY

His Attorney

United States Patent Office 2,863,311
Patented Dec. 9, 1958

2,863,311

GYRATION AND ROTATION MECHANISM FOR DOMESTIC APPLIANCE

Byron L. Brucken, Dayton, Ohio, assignor to General Motors Corporation, Detroit, Mich., a corporation of Delaware Application June 29, 1954, Serial No. 439,989

11 Claims. (Cl. 68—12)

This invention relates to domestic appliances and more particularly to a clothes washing machine, a clothes dryer, and/or a combined clothes washer and dryer.

An object of this invention is to provide a laundry machine having a tub or basket, the axis of which is gyrated in one direction while the tub is simultaneously rotated at relatively slow speed in the opposite direction.

Another object of this invention is to provide a laundry machine as set forth in the foregoing object, in which the tub is also spun at relatively high speed to produce a wringing action.

Another object of this invention is to provide a laundry machine having a tub, the axis of which is gyrated in one direction, while the tub is simultaneously rotated at slow speed in the opposite direction, and in which a counterbalancing weight is provided to be moved in counterbalancing relationship with the tub during gyration.

Another object of this invention is to provide a laundry machine as set forth in the foregoing object in which the tub is also spun at relatively high speed to produce a wringing action, and in which the counterbalancing weight is freed during such spinning action.

Another object of this invention is to provide a combined washing and drying machine having a tub with gyration means to gyrate the axis of the tub in one direction while rotating the tub in the opposite direction at relatively slow speed to produce agitation, and in which spin means is provided to spin the tub at relatively high speed to produce a wringing action, and in which water flow means are provided to introduce water into the tub to wash clothes, and in which air flow means are provided to flow drying air into the tub after the washing action and spinning action are completed.

Another object of this invention is to provide a combined washer-dryer as set forth in the foregoing object, in which the air flow means flows drying air into the tub, then past a vapor condenser, then past an air heater and then back into said tub.

Another object of this invention is to provide a clothes dryer in which a vertically disposed tub or basket is agitated in a clothes fluffing manner and in which drying air is directed into said tub or basket to dry the clothes.

Further objects and advantages of the present invention will be apparent from the following description, reference being had to the accompanying drawings wherein a preferred form of the invention is clearly shown.

In the drawings, 30 is a cabinet, which may have a rectangular horizontal cross-section. The cabinet is provided with a bulkhead 31 which receives the water extracted from the clothes and discharged from the tub. The bulkhead 31 supports flexible rubber-like collar 32 which seals the opening 33 of the bulkhead 31. The flexible collar surrounds the drive shaft 35 in a sealing but rotationally free relationship at 34. A power unit 36 is placed below the bulkhead 31 and a tub 37 is placed above the bulkhead 31. The tub is outwardly flared and is provided with discharge openings 37a. The construction is such that the power unit 36 produces gyration of the axis of the tub 37 in one direction, to produce an agitating and/or fluffing action and simultaneously rotates the tub at relatively slow speed in the opposite direction, and to produce a spinning action of the tub at relatively high speed to produce a centrifugal wringing action. The specific mechanisms to produce these actions are described elsewhere in the specification.

The power unit 36 is centered on the resiliently held extension 36a, and gyrates about such extension 36a. Another resiliently held pin 36b prevents the power unit from rotating about the extension 36a.

The cabinet 30 may be provided with an inner cylindrical wall 38 to which the vertical walls of the cabinet are tangential at points 39.

Water flow means are provided in the cabinet to introduce water through the funnel 40 into the tub, so that clothes may be washed in the tub and thereafter wrung centrifugally one or more times. Air flow means are provided to flow drying air 41 through a nozzle 42 into the tub 37 to produce a drying action on the clothes after they have been washed and spun. The tub is gyrated and slowly rotated at this time to produce a clothes fluffing action to aid in drying the clothes. The air may be subsequently cooled to condense water vapor removed from the clothes, and the air may then be reheated for reuse in drying the clothes. Detailed mechanisms for accomplishing the water flow and air flow are described elsewhere in the specification.

*Combined gyration and slow rotation and subsequent spin*

The power unit 36 causes the tub 37 to gyrate in one direction and rotate slowly in the opposite direction, and to spin at high speed, for producing clothes washing and/or fluffing action by mechanisms shown in some detail in Figures 10 through 22.

The high speed spin action is produced by causing the reversible motor 50 to rotate clockwise, when looking down on the motor. The motor shaft 51, rotating clockwise, causes the tub shaft 35 also to spin clockwise by transmission means diagrammatically indicated in heavy lines in Figure 12, and shown in enlarged cross-section in Figure 11. When the motor shaft 51 rotates clockwise, it causes one-way spring clutch 55 to engage the double cup 56 which cup is rotationally free on shaft 51 by virtue of the roller bearings 57. The spring 55 has one end fixedly secured to cup 52 which cup is fixed to shaft 51 by pin 53. The upper end of spring 55 is loose about the double cup 56. The cup 56 has an inner sleeve 58 which is fixed to the tub shaft 35 by the pin 59. Therefore, the cup 56 and sleeve 58 cause the tub shaft 35 to rotate clockwise whenever the motor shaft 51 is rotated clockwise. The shaft 35 is free of direct drive connection with drive shaft 51 by reason of thrust bearing 56a. During the spin time, the gearing which otherwise would produce gyration and slow rotation does not transmit power because the one-way clutches 60 and 61 are not engaged when the parts are rotating in this direction. The spring clutch 61 has its upper end fixed to cup 62 and is loose about sleeve 58 during spin. A solenoid 190 is provided which moves the plunger 190a into the teeth of gear 75, when energized during spin, to prevent idling of eccentric 78 at that time.

Figures 12, 13, 14, 15, 16:
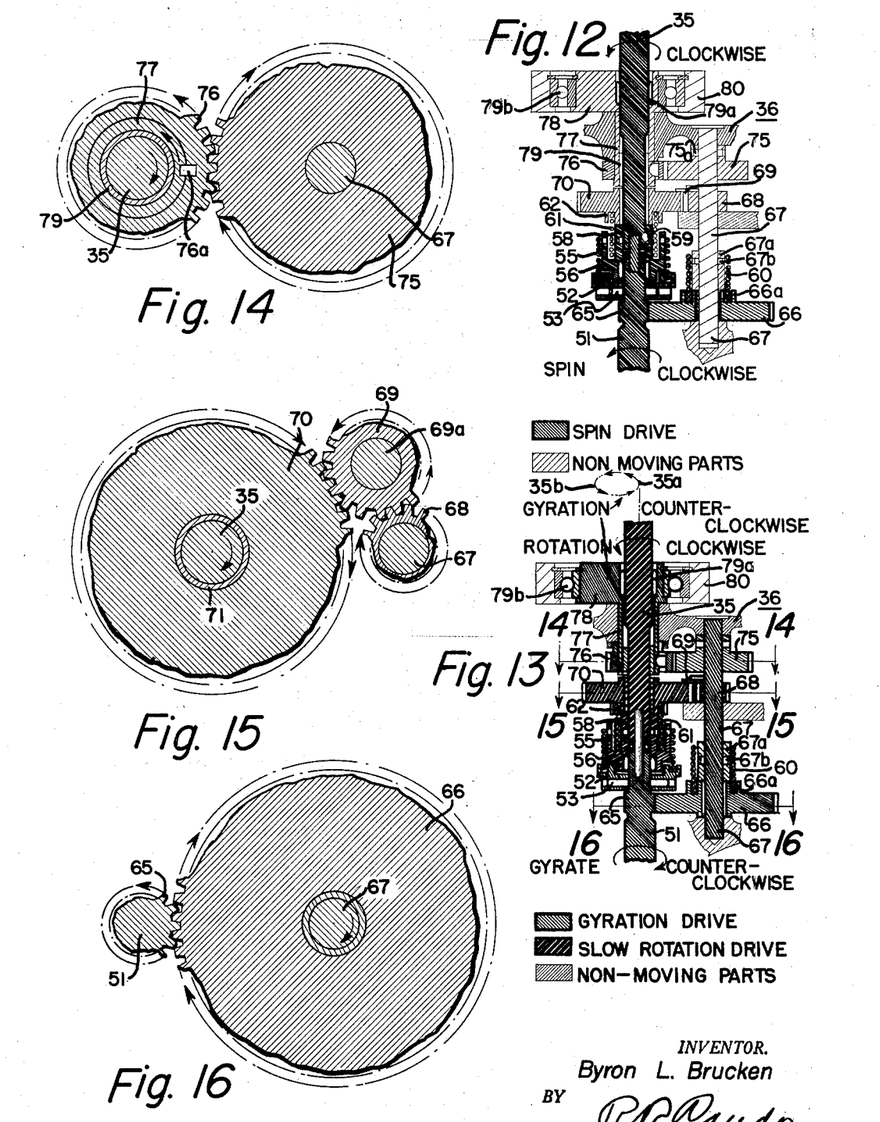
Figure 12 is a diagrammatic view showing in heavy lines the transmission of the power unit which produces a spinning action.
Figure 13 is a view similar to Figure 12, showing the transmission in heavy lines which produces agitation action.
Figure 14 is a horizontal cross-section taken along the line 14—14 of Figure 11.
Figure 15 is a horizontal cross-section taken along the line 15—15 of Figure 11.
Figure 16 is a horizontal cross-section taken along the line 16—16 of Figure 11.

Combined gyration and slow rotation are produced when the motor shaft 51 is rotated in a counterclockwise direction, when looking down on the shaft, and the action can be readily followed by reference to Figures 11, 13, 14, 15 and 16. Figure 13 shows the active parts of the transmission for gyration in heavy lines. The motor shaft 51, through the gear 65, drives the gear 66 in a clockwise direction (Figure 16) and causes the one-way spring clutch 60 to drive the shaft 67 clockwise at a speed to rotate the tub at 60 R. P. M. clockwise. The spring 60 is fixed to the cup 66a and is loose about sleeve 67a. Sleeve 67a is fixed to shaft 67 by pin 67b. The spring 60 wraps tightly about sleeve 67a during gyration and hence drives the shaft 67. The shaft 67 has a gear 68 fixed thereto by pin 68a (Figure 15) engaging an idler gear 69 which meshes with the gear 70 which rotates freely about the shaft 35 by reason of the bearing sleeve 71. Idler gear 69 is carried by pin 69a carried by plate 69c of the casing 36. The one-way spring clutch 61 is fixed to the gear 70, and engages the sleeve 58 to drive the tub shaft 35 at 60 R. P. M. in a clockwise direction. Gyration is produced by the gear 75 which is fixed to the shaft 67 by pin 75a and drives the gear 76 which is fixed to the sleeve 77 and eccentric 78 by pin 76a. Eccentric 78 is rotationally free with respect to the fixing and freeing collar 80 and with respect to the tub shaft 35, by reason of bearings 79, 79a and 79b. The collar 80 is held in a fixed position while the eccentric 78 is being rotated, and this causes the shaft axis 35a of shaft 35 to be gyrated counterclockwise at 300 R. P. M. as indicated by arrows 35b in Figure 13, when the gear ratios are substantially as indicated in the drawings and when the motor rotates at 1140 R. P. M.

A counterweight 180 is provided to counterbalance the gyration movement of the tub while the tub is gyrating, and to be inoperative during the spinning of the tub. To this end, the arm 181 which carries the counterweight 180 is secured to the eccentric 78 by bolts 182 or the like. The counterweight 180 is located on the opposite side from the throw of the tub during gyration.

*Collar fixing and freeing mechanism*

Figures 17, 18:
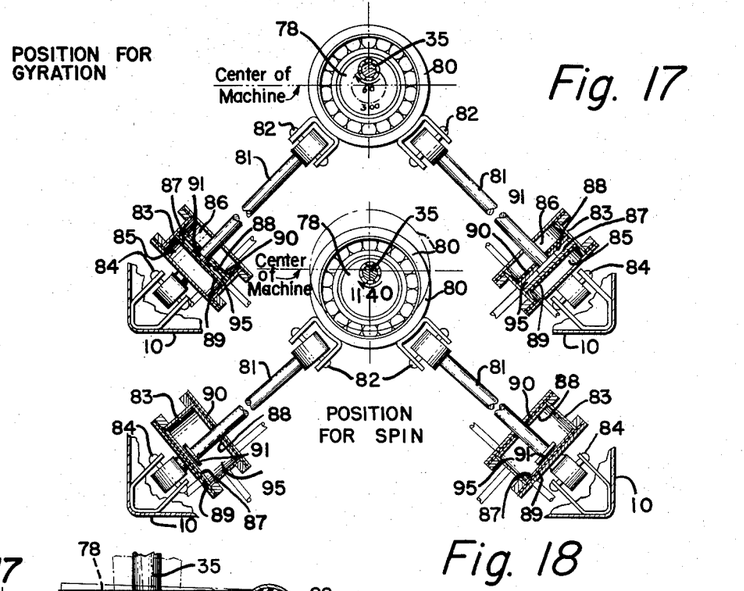
Figure 17 is a horizontal cross-section, partly diagrammatic, showing the collar fixing means in a fixing position to produce agitation.
Figure 18 is a view similar to Figure 17 showing the collar fixing means in a free position during spin.
Figure 19:
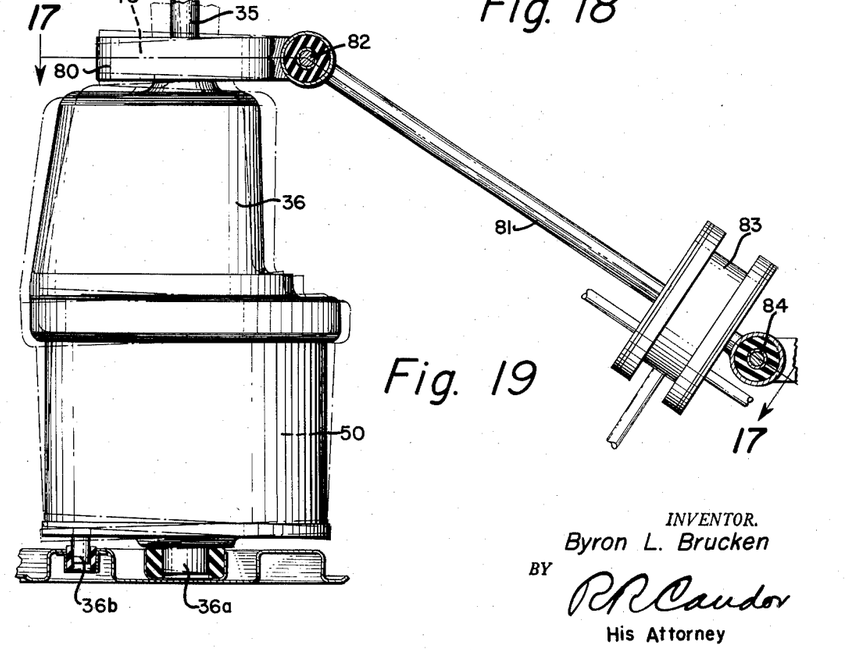
Figure 19 is a vertical elevation showing the action of the collar fixing means in position to produce agitation.
Figure 20:
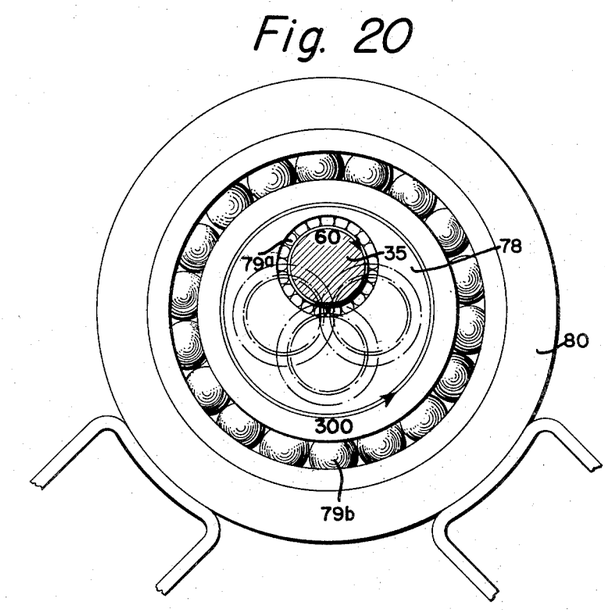
Figure 20 is a horizontal cross-section taken along the line 20—20 of Figure 11.
Figure 21:
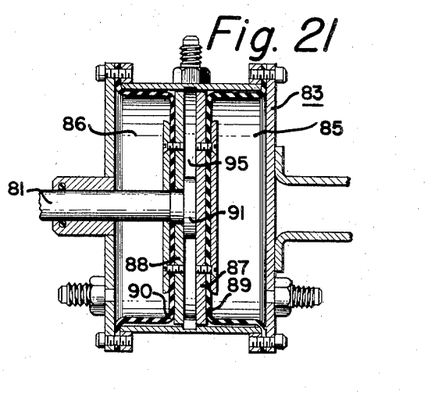
Figure 21 is a cross-section of the hydraulic plunger to fix or free the collar which produces agitation.
Figure 22:
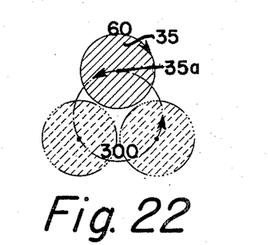
Figure 22 is a diagrammatic showing of the combined gyration and slow rotation of the shaft which holds the tub.

When gyration is to be produced, the collar 80 is held in a fixed position, and when spinning is to take place the collar 80 is freed. This is accomplished by mechanism more fully shown in Figures 17 to 22. The rods 81 are hinged to the collar 80 at 82 and are connected with the holding means 83 at the other end. The holding means 83 are hinged at 84 to the cabinet. When water is introduced into the compartments 85 and 86 (Figures 17 and 21), the plates 87 and 88 are held in a central position by the flexible diaphragms 89 and 90. The rod 81 has a disk 91 secured at its end and freely passes through the disk 88 when the disks 88 and 87 hold the disk 91 tightly (Figures 17 and 21), then the rods are held against longitudinal movement and thus hold the collar 80 in the fixing position of Figure 17. When water is removed from the compartments 85 and 86 and the water is introduced under pressure into the compartment 95, the plates 88 and 89 are spread apart, and then the rods 81 are freed and the collar 80 is permitted to assume any position, such as in Figure 18. Therefore, the rods 81 can be held in a central position, as shown in Figure 17, or they can be held in a freed position as shown in Figure 18. Under these conditions, the axis 35a of the tub 37 and the axis of shaft 35 can be gyrated counterclockwise at 300 R. P. M. while the tub 37 itself and shaft 35 are being rotated clockwise in an opposite direction at 60 R. P. M. (which is a relatively slow speed), as indicated in Figures 17, 20 and 22. Also, the tub can be spun clockwise at a relatively high speed of 1140 R. P. M., without producing the 300 R. P. M. gyration, as indicated in Figures 12 and 18, under which conditions the tub axis is free to swing in whatever direction the spinning action requires.

*Air flow*

Figures 1, 2, 3, 4:
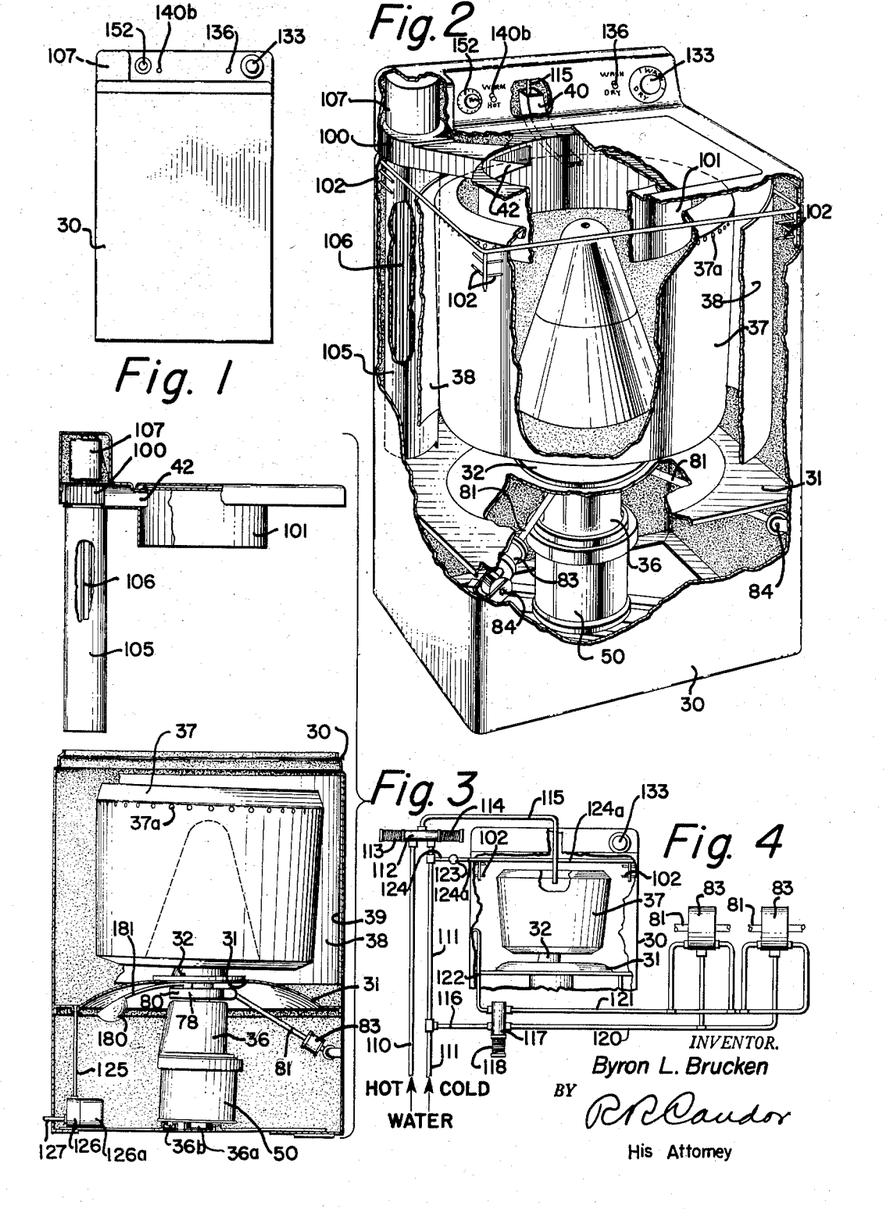
Figure 1 is a front elevation of the cabinet for the washing machine and/or dryer.
Figure 2 is a perspective, partly in elevation, of the cabinet and mechanism.
Figure 3 is a vertical cross-section of the cabinet with the washing mechanism in the cabinet, and with part of the air flow mechanism lifted out of the cabinet.
Figure 4 is a diagrammatic view showing the water flow connections for the machine.
Figure 5:
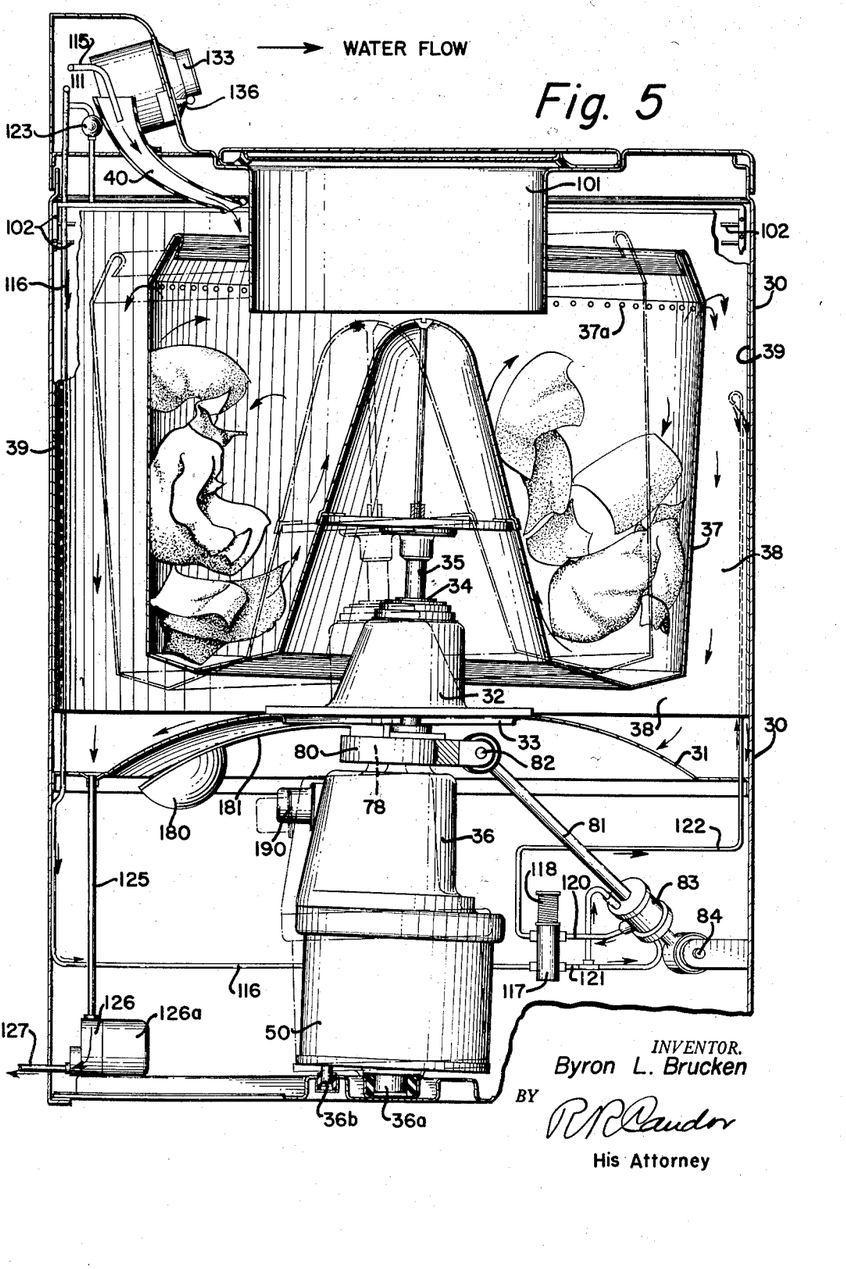
Figure 5 is a vertical cross-section of the combined washing and drying machine taken along the line 5—5 of Figure 8 and showing the mechanism during agitation.
Figure 6:
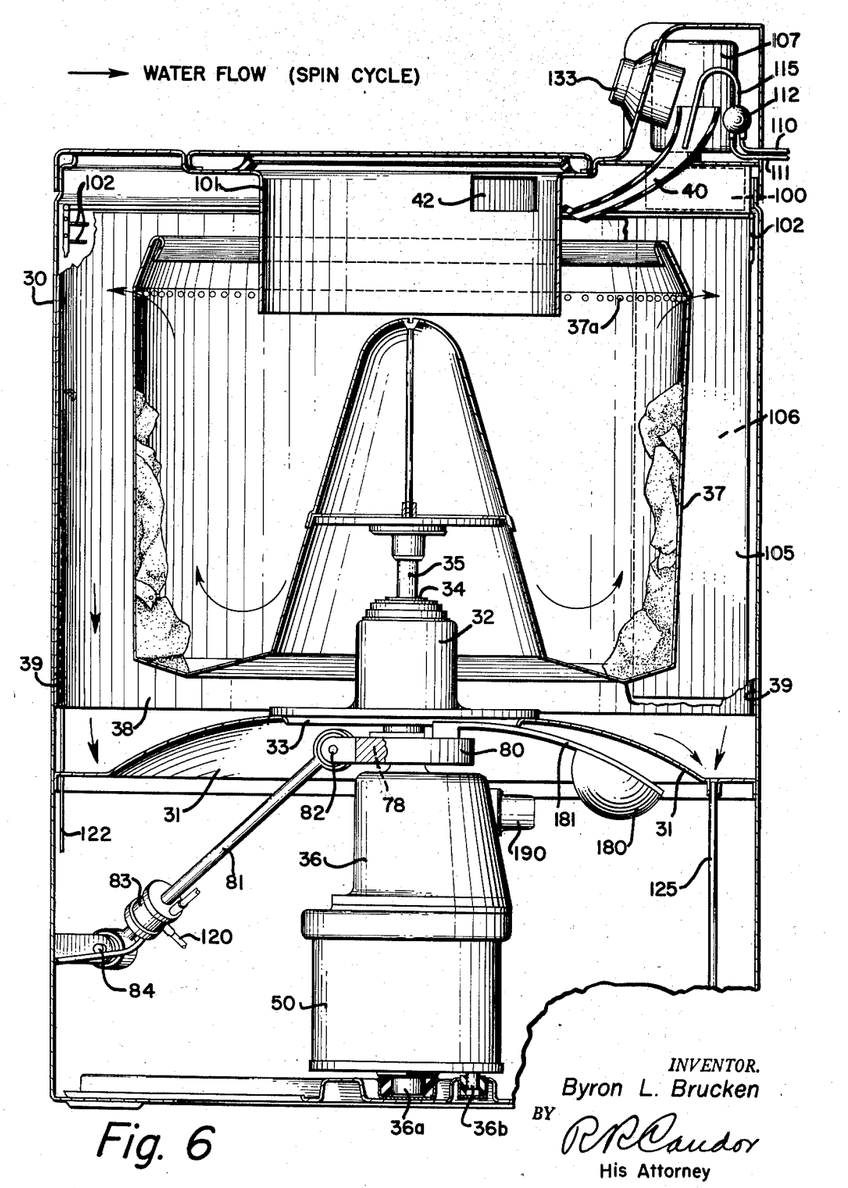
Figure 6 is a view similar to Figure 5, taken along the line 6—6 of Figure 8, and modified to show the spin action.
Figure 7:
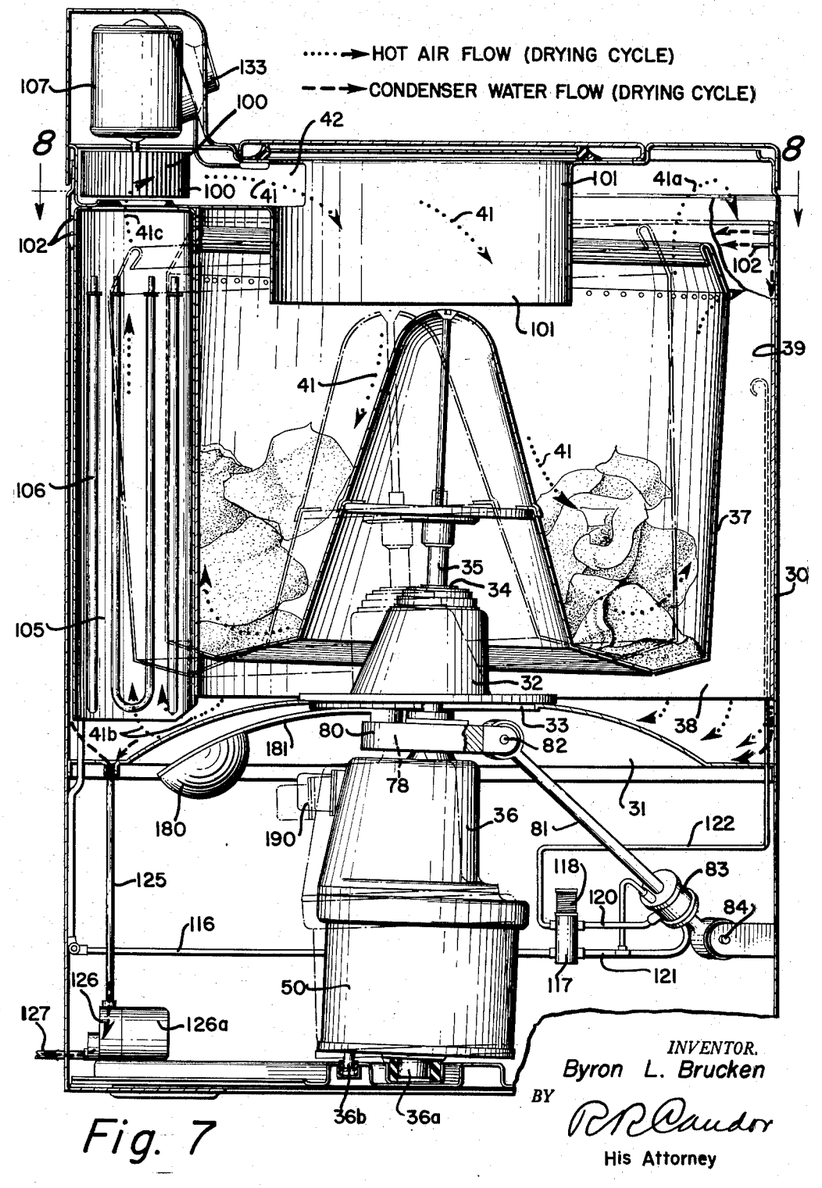
Figure 7 is a view similar to Figure 5, taken along the line 7—7 of Figure 8, showing the air flow connections, and showing the tub operating to fluff the clothes.
Figure 8:
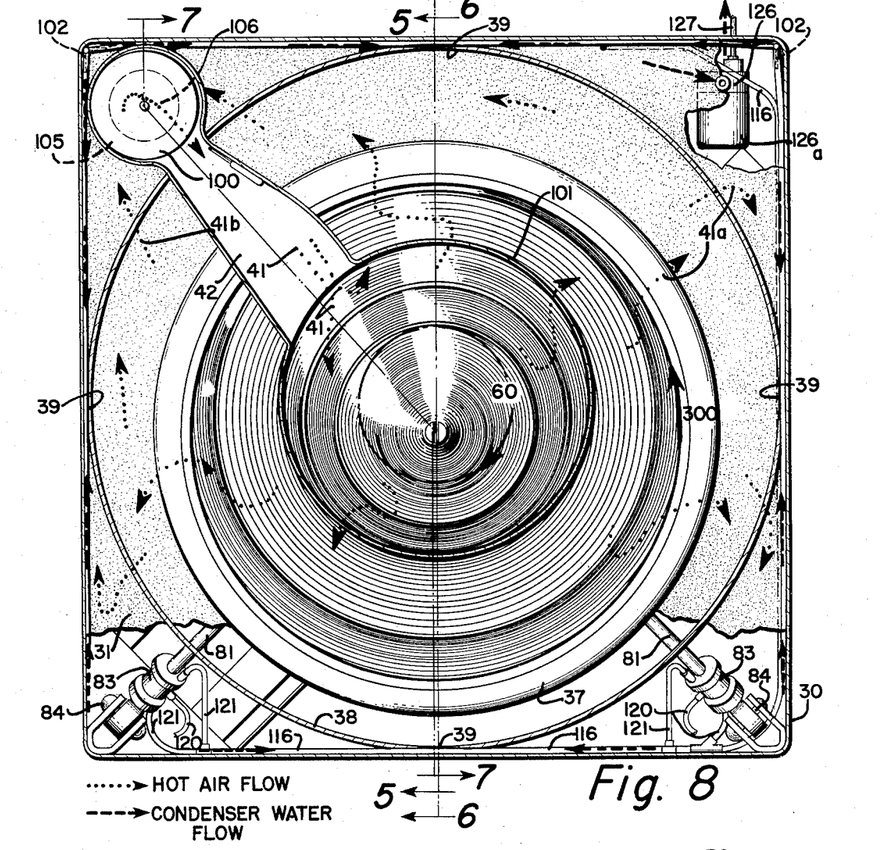
Figure 8 is a horizontal cross-section taken along the line 8—8 of Figure 7.
Figure 9:
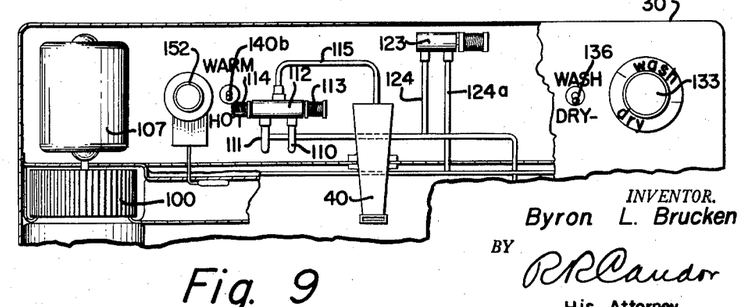
Figure 9 is a view, partly diagrammatic, showing the control details and part of the water and air flow mechanisms.
Figure 10:
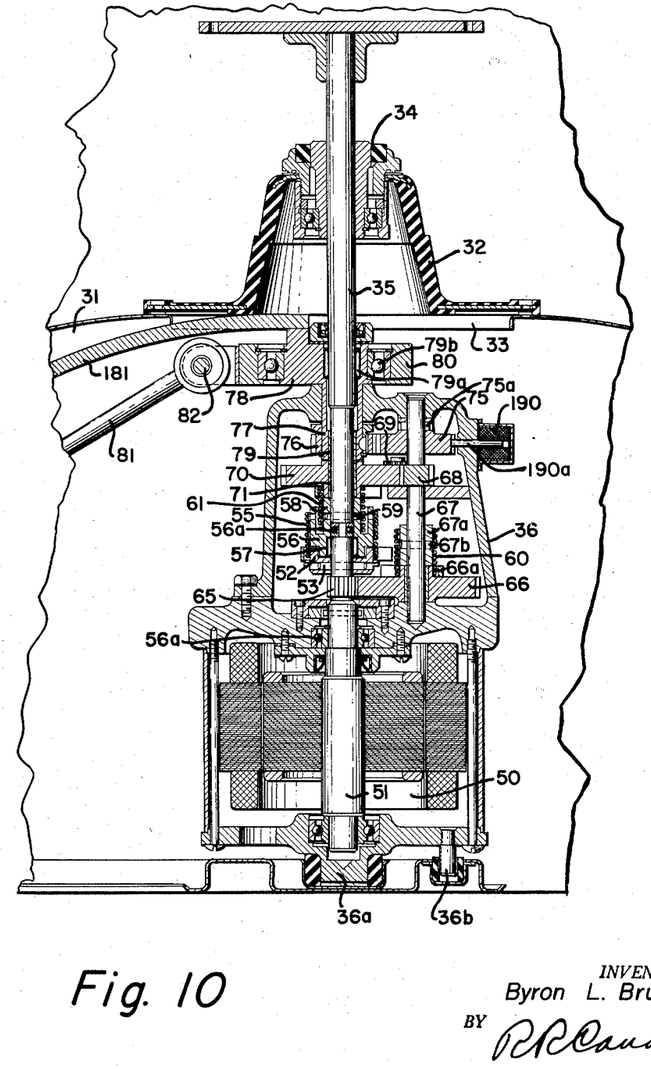
Figure 10 is a cross-section of the power unit, and parts immediately adjacent thereto.
Figure 11:
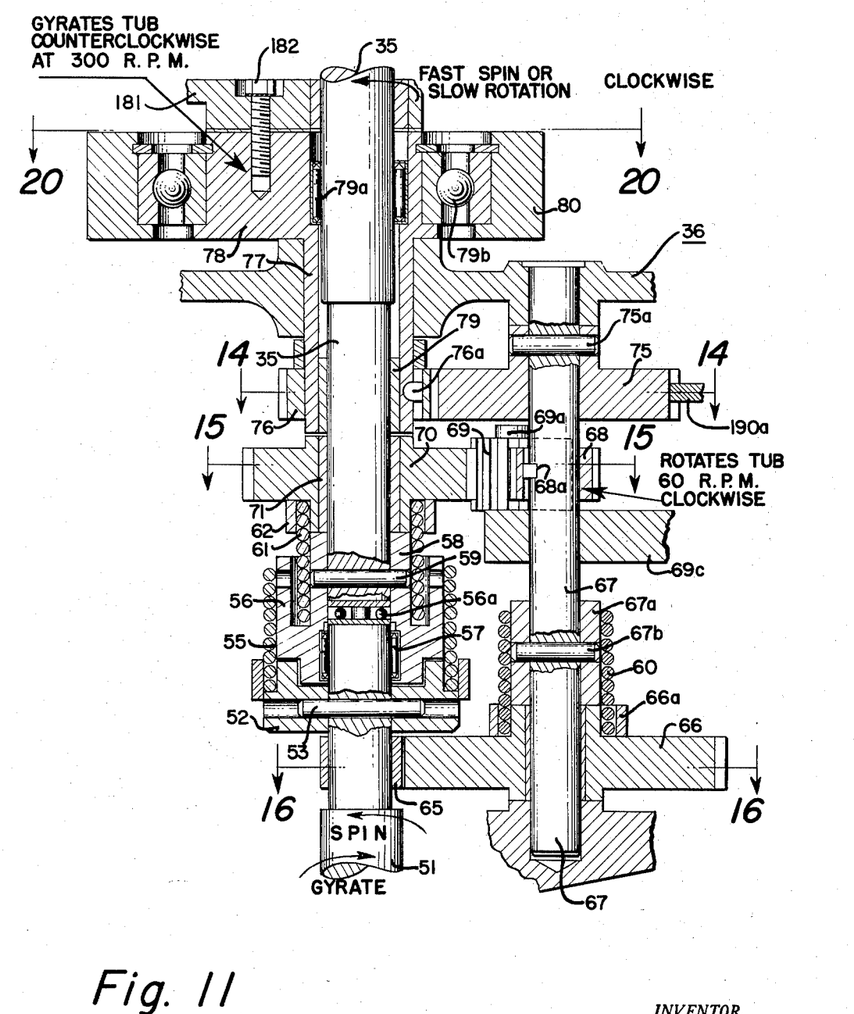
Figure 11 is an enlarged cross-section of a portion of Figure 10.

Air is caused to flow in a heated condition into the tub, then past a vapor condenser, then past an air heater, and then back into the tub. The air flow is more readily understood by reference to Figures 2, 7 and 8. The blower 100 blows heated air 41 through the nozzle 42 into the cylinder 101 which is held in the mouth of the tub 37 by the cabinet. The heated air 41 flows downwardly, as indicated in Figure 7 and dries the clothes, which are being fluffed by the previously described combined gyration and slow rotation of the tub. The air then flows out through the mouth of the tub as indicated by the arrow 41a in Figure 7 and down between the outside of the tub 37 and the inside of the cabinet 30. A large part of the air flows down between the cylindrical wall 38 and the outer cabinet walls 30.

Cold water is sprayed along the inside of the walls of the cabinet 30 by the nozzles 102, and this cold water condenses the water vapor which has been carried by the drying air 41a from the clothes, which flows between the walls 30 and 38. Thereafter, the drying air flows as indicated by the arrows 41b in Figure 7 up through a cylindrical heating chamber 105 which is provided with electric heating units 106. The air is heated within the heating chamber 105 and then flows as indicated by the arrow 41c into the blower 100 from whence the heated air is once again returned to the tub 37 through the nozzle 42. The blower 100 is driven by the motor 107.

*Water flow means*

Water is introduced into the combined washer and dryer for the purpose of filling the tub 37 with hot or lukewarm water for washing or rinsing the clothes. Cold water is also introduced into the vapor condenser between the walls 30 and 38 through the nozzles 102 for the purpose of condensing the water vapor from the drying air 41a after it has passed through the tub and has absorbed moisture from the clothes. Water is also introduced into the holding means 83 to fix or free the collar 80 to produce or not produce gyration. The water flow means are diagrammatically shown in Figure 4. Hot water is supplied at 110 and cold water at 111. These waters enter the valve 112, which is provided with a hot water controlling solenoid 113 and a cold water controlling solenoid 114. The valve 112 itself is provided with a thermostat and a constant pressure discharge device, so that water of the correct temperature and pressure is delivered by the pipe 115 and nozzle 40 into the tub 37. Valves similar to that diagrammatically indicated at 112 are well known and therefore further description is deemed unnecessary. Cold water flows through the branch 116 to the valve 117 which is controlled by the solenoid 118. The solenoid 118, by proper energization or deenergization causes water to enter the pipe 120 or the pipe 121 and to disharge water at 122. When water enters the pipe 121, water is supplied to the compartments 85 and 86 (Figures 17 and 21) of holding means 83, and the collar 80 is then held in fixed position as shown in Figure 17. At the same time, the pipe 120 is connected with the discharge line 122, so that any water which was contained in the compartment 95 (Figure 21) can pass into the pipe 120 and thence into the discharge pipe 122 and be discharged above the bulkhead 30. On the other hand, when the solenoid causes water to enter the pipe 120, then water is introduced into the compartment 95 (Figure 21), and the water from compartments 85 and 86 are emptied through the pipe 121 and discharge pipe 122 into the space above the bulkhead 30. The collar 80 is then freed, as indicated in Figure 18, and the tub is free to swing while spinning at high speed.

Condenser water, in cold condition, is supplied through the pipe 111 to the pipe 124, thence through the condenser valve 123, which may be solenoid operated, and then flows through the pipe 124a to the nozzles 102 which deliver cold water to the inside walls of the cabinet to condense water vapor from the drying air 41a.

All of the water discharged into the tub, condenser or holding means eventually is discharged from the upper side of bulkhead 31 through the pipe 125 to the pump 126 which forces it through the pipe 127 to a stationary tub or drain. The pump 126 is driven by its own motor 126a, as indicated.

*Control means*

Figure 23:
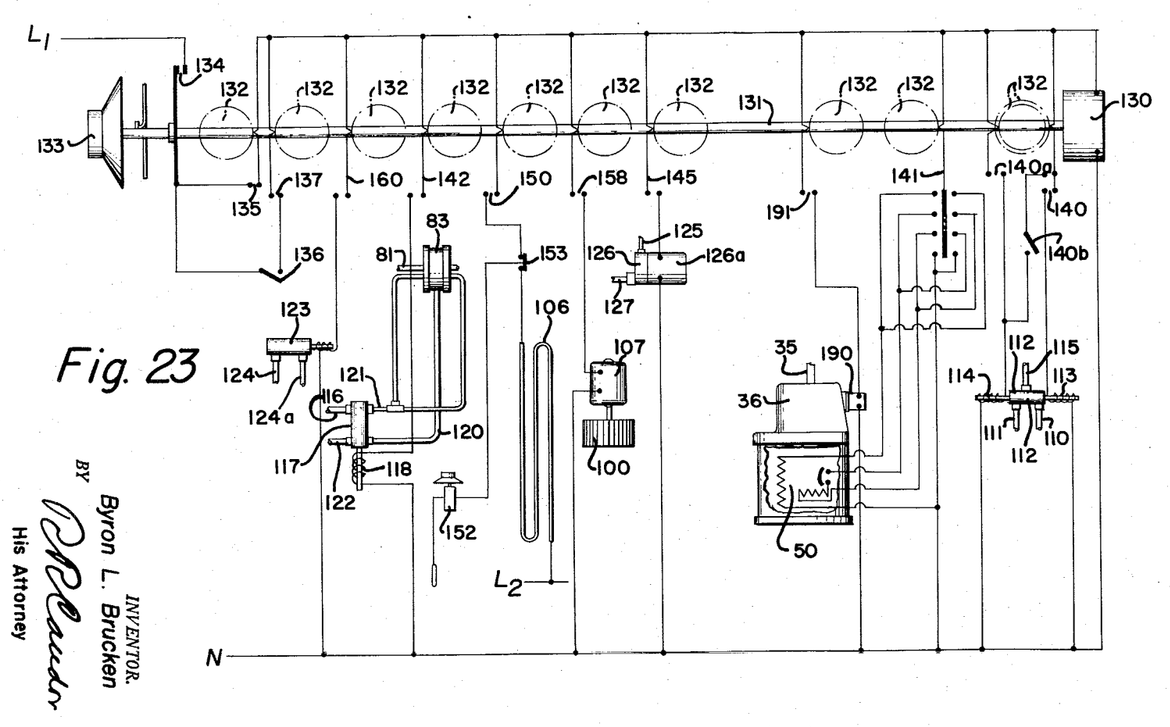
Figure 23 is a wiring diagram showing the timer and the elements controlled thereby.

Control means are provided for the combined washer-dryer. To this end, a timer motor 130 (Figure 23) drives a timer shaft 131 provided with a plurality of cams 132 to make and break connections actuated by said cams as herein described. The shaft 131 is provided with a knob 133 which may be used to rotate the shaft 131 independently of the motor 130 and also to push or pull the shaft axially. A timer of this general character is shown and described in the patent to Sisson No. 2,520,695, granted August 29, 1950.

The knob 133 is provided with suitable indications such as "off" and various washing and drying indications now well known. When the knob 133 is rotated to the first "on" position, and pushed in, the contacts 134 are closed as well as the contacts 135. This energizes the timer motor 130 to cause the machine to operate throughout all the washing and spinning operations and then to stop, unless the manual switch 136 is previously closed. The switch 136, if closed, supplies current to the contacts 137 which are closed at the time when the washing and spinning operations are being terminated, and then the timer 130 continues to run to produce the drying operation. If drying only is desired, then the knob 133 is turned to the first drying indication and pushed in, and the switch 136 is closed manually whereupon the drying operations are performed without any previous washing operations.

When the timer is turned to the first washing operation, and the contacts 134 and 135 are closed, the contacts 140 are also closed, and the solenoid 113 is energized. Hot water is introduced through the pipe 115 from pipe 110 for a sufficient length of time to properly fill the tub 37. Thereafter, the solenoid 113 is deenergized, and combined gyration and slow rotation are produced by the moving of contact blade 141 to the left to cause motor shaft 51 to rotate counterclockwise to produce agitation as in Figure 13. At the same time, the blade 142 energizes the solenoid 118 to introduce water into the pipe 121 and compartments 85 and 86 in the holding means 83 to hold the collar 80 as indicated in Figure 17. The wash water, with previously added detergent, and clothes are then agitated for a sufficient length of time to produce a washing action. Thereafter the blade 141 is moved to the right to cause motor shaft 51 to rotate clockwise to produce spin as in Figure 11. The blade 142 opens its contacts. The tub is spun at high speed while the solenoid 118 is simultaneously deenergized to introduce water into the pipe 120 to fill the compartment 95 and to empty the compartments 85 and 86 and free the collar 80 and tub as indicated in Figure 18. The tub is spun at a relatively high speed of 1140 R. P. M. for a sufficient length of time to wring the clothes and is free to swing as required by the condition of the clothes, since the collar 80 is also free. The solenoid 190 is also energized during the spin operation, by the closing of contacts 191 to cause armature 190a to move to the left to hold gear 75 against idling rotation during spin. Thereafter, one or more filling, agitation and spinning operations are repeated with hot water, or mixed water as desired to wash the clothes thoroughly. Mixed water is automatically introduced for the first and second rinse by the simultaneous closing of the contacts 140 and 140a. If desired, only cold water is automatically introduced for one or more rinses by constructing the timer to close only the contacts 140a for those rinses. When mixed water is desired as a substitute for hot water, then the manual selector switch 140b is manually closed, so that both solenoids 113 and 114 are energized when contacts 140 are closed. During the entire washing operation, or the proper intervals as desired, the blade 145 closes its contacts, and causes the water pump 126 to be operated by its separate motor 126a to empty the water which is discharged into the space above the bulkhead 30.

The drying operation can start immediately after the final spin operation, and this occurs if the manual switch 136 is in closed position. The heating elements 106 are energized at 220 volts. The heaters 106 are also under the control of a manual adjustable thermostat 152, which opens the contacts 153 if the temperatures in the machine rise above a predetermined limit. At the start of the heating operation, the blower 100 is rotated by its motor 107, which is energized by the closing of the contacts 158. The blade 145 also energizes the water pump 126. Combined gyration and slow rotation are produced by the moving of timer blade 141 to the left. The blade 160 energizes the condenser spray valve 123. Under these conditions, hot air 41 is blown into the tub 37 where it picks up water vapor from the clothes, and then flows (41a) to the condensing walls within the cabinet 30 and outside cylindrical wall 38 where the water vapor is condensed from the air. From there the air 41b flows into the heater compartment 105 where it is reheated and returns to the blower 100 and nozzle 42 again to enter the tub 37. Near the end of the drying cycle the heaters 106 are turned off by opening contacts 150 while the blower 100, combined gyration and slow rotation and condenser water spray continue long enough to cool the clothes just before the end of the drying cycle. At the end of the drying cycle, the timer motor 130 deenergizes itself by opening the contacts 137. The contacts 135 had previously been opened at the end of the washing cycle.

The washing operation can be automatically controlled without drying by moving knob 133 to the washing start position and by manually opening switch 136. The drying operation can be automatically controlled without washing; by moving the knob 133 to the initial drying position and manually closing switch 136 combined washing and drying can be automatically controlled by moving knob 133 to the washing start position and manually closing switch 136.

Features disclosed herein may be used in a washing machine alone, a drying machine alone, or in a combined washer-dryer.

While the form of embodiment of the invention as herein disclosed constitutes a preferred form, it is to be understood that other forms might be adopted as may come within the scope of the claims which follow.

What is claimed is as follows:

1. In combination: a tub; means to produce gyration of the axis of said tub in one direction to produce an agitating action; and means for simultaneously rotating said tub about said axis in the opposite direction.

2. In combination: a tub; means to produce gyration of the axis of said tub in one direction to produce an agitating action; means for simultaneously rotating said tub at relatively slow speed about said axis in the opposite direction; and means for spinning said tub at relatively high speed to produce a wringing action.

3. In combination: a tub; means to produce gyration of the axis of said tub in one direction to produce an agitating action; means for simultaneously rotating said tub at relatively slow speed about said axis in the opposite direction; means for spinning said tub at relatively high speed to produce a wringing action; a counterbalancing weight; and means to drive said weight in counterbalancing relationship to said tub during gyration.

4. In combination: a tub; means to produce gyration of the axis of said tub in one direction to produce an agitating action; means for simultaneously rotating said tub at relatively slow speed about said axis in the opposite direction; means for spinning said tub at relatively high speed to produce a wringing action; a counterbalancing weight; means to drive said weight in counterbalancing relationship to said tub during gyration; and means for releasing said counterbalancing weight during spinning action.

5. In combination: a tub; a power unit; a rotary tub drive shaft rotationally fixed to said tub; a gyratory sleeve surrounding said drive shaft; an eccentric fixed to said sleeve; a rotationally fixed collar surrounding said eccentric in bearing relationship to said eccentric; collar fixing and freeing means to fix said collar against oscillation for producing gyration of said drive shaft and tub and to free said collar to oscillate and to terminate said gyration; gyration transmission means to rotate said eccentric from said power unit; and a gyration counterbalancing weight rotated simultaneously with said eccentric.

6. In combination: a vertically disposed tub; a cone adjacent the central portion of the bottom of said tub; gyration means to produce gyration of the axis of said tub in one direction to produce an agitating action; means simultaneously rotating said tub at relatively slow speed about said axis in the opposite direction; and means for spinning said tub at relatively high speed while said gyration means is idle to produce a wringing action.

7. In combination: a tub; gyration means to gyrate the axis of said tub in one direction while rotating said tub in the opposite direction at relatively slow speed to produce agitation; spin means to spin said tub at relatively high speed to produce a wringing action; and water flow means to introduce water into said tub.

8. In combination: a tub; gyration means to gyrate the axis of said tub in one direction while rotating said tub in the opposite direction at relatively slow speed to produce agitation; spin means to spin said tub at relatively high speed to produce a wringing action; water flow means to introduce water into said tub; and air flow means to flow drying air into said tub.

9. In combination: a tub; gyration means to gyrate the axis of said tub in one direction while rotating said tub in the opposite direction at relatively slow speed to produce agitation; spin means to spin said tub at relatively high speed to produce a wringing action; water flow means to introduce water into said tub; and air flow means to flow drying air into said tub, then past a vapor condenser, then past an air heater, and then back into said tub.

10. In combination: a tub; gyration means to gyrate the axis of said tub in one direction while rotating said tub in the opposite direction at relatively slow speed to produce agitation; spin means to spin said tub at relatively high speed to produce a wringing action; water flow means to introduce water into said tub; air flow means to flow drying air into said tub, then past a vapor condenser, then past an air heater, and then back into said tub; and control means first to actuate said water flow means, then said gyration means, then said spin means, and then simultaneously said air flow means and said gyration means.

11. In combination: a tub; gyration means to gyrate the axis of said tub in one direction while rotating said tub in the opposite direction at relatively slow speed to produce agitation; spin means to spin said tub at relatively high speed to produce a wringing action; water flow means to introduce water into said tub; air flow means to flow drying air into said tub, then past a vapor condenser, then past an air heater, and then back into said tub; control means first to actuate said water flow means, then said gyration means, then said spin means, and then simultaneously said air flow means and said gyration means; and selector means for said control means to select actuation of said water flow means, gyration means and spin means to produce a washing wringing action alone, of said air flow means and said gyration means to produce a drying action alone, or of said water flow means, gyration means, spin means, and air flow means in proper relationship to produce a combined washing, wringing and drying action.

References Cited in the file of this patent

UNITED STATES PATENTS

| | | |
|---|---|---|
| 2,350,218 | De Remer | May 30, 1944 |
| 2,449,634 | Baade | Sept. 21, 1948 |
| 2,495,535 | Morrison | Jan. 24, 1950 |
| 2,578,278 | Archbold | Dec. 11, 1951 |
| 2,607,209 | Constantine | Aug. 19, 1952 |
| 2,656,695 | Miller | Oct. 27, 1953 |
| 2,658,372 | Kirby | Nov. 10, 1953 |
| 2,699,660 | Kirby | Jan. 18, 1955 |